3,835,021
SOLID WASTE DISPOSAL PROCESS

William K. Lorenz, Ridley Park, Pa., Edward C. Sebesta, Houston, Tex., and Charles L. McClellan, Birmingham, Ala., assignors to Sun Oil Company of Pennsylvania, Philadelphia, Pa.
No Drawing. Filed Mar. 12, 1973, Ser. No. 340,407
Int. Cl. C02c 3/00, 5/10
U.S. Cl. 208—13                    5 Claims

ABSTRACT OF THE DISCLOSURE

In the process of disposing refinery waste sludge materials, the improvement which comprises dewatering and deoiling refinery sludges by filtering through a filter press at a temperature of from about 100° F. to about 200° F., washing of the filter cake with hot water, and subjecting the solid filter cake thus obtained to soil biodegradation.

---

The handling of solid refinery waste materials is a difficult problem due to numerous factors such as the diversity of waste, contamination of wastes with oil, water, solvents, etc., and the high capital and operating costs of treatment and disposal make such processes expensive. Because of the need for environmental improvement, however, it is necessary that waste treatments and controls be included in manufacturing and industrial processing and there is an obvious need for improved waste disposal techniques. A particular problem within the petroleum industry with respect to the handling of wastes has been the separation and disposal of solid waste materials. In many instances oil containing solids must be separated from oil containing liquids (e.g., emulsions of oil in water and water in oil) and after such separation, the oil containing liquids are difficult to dispose without pollution or they must be specially treated to separate and recover oil therefrom.

It is known in the art that refinery oil sludge materials may be subjected to the action of soil bacteria whereby the soil is decomposed over a period of time. In a paper presented at the Fifth International Water Pollution Research Conference and Exhibition, San Francisco, Calif., July 26 through Aug. 1, 1970, G. K. Dotson and his co-workers describe the techniques of several refineries where such land spreading operations were carried out. In all of those processes the sludge materials from the refinery were taken directly to a land receptacle and worked into the soil. Where oil was recovered from the sludge materials, the technique used was to bring the oily sludge and emulsions from the refinery to the land area by vacuum truck and discharge them into an enclosed area where they were allowed to spread to a depth of about 6 inches. After settling, the oil which separated to the top was recovered by the vacuum truck for return to the refinery and the remaining sludge was mixed with soil by bulldozer. Such a technique is not only very inefficient with respect to oil recovery, but also actually contributes to pollution because run-off waters from rain on the raw sludge carry away oil and cause oil contamination of streams.

It has now been found, in accord with this invention, that refinery waste sludge materials may be efficiently disposed without pollution by dewatering and deoiling refinery sludges through a filter press at a temperature of from about 100° F. to about 200° F., washing the filter cake with hot water, recovering the oil removed from said sludge, and applying the solid filter cake to soil for biodegradation.

The process of this invention is particularly advantageous in several aspects. First of all, it permits high recovery of oil from waste materials. This efficient oil recovery is attributed to the combination of the filtration step which breaks the oil-in-water and water-in-oil emulsions in the sludge materials and to carrying out the filtration at a temperature of from about 100° F. to about 200° F. which tends to remove the maximum amount of oil from the solid materials. In addition, the step of washing the filter cake wtih hot water removes additional oil which is retained on the cake after the filtration and thereby permits maximum oil recovery and results in a filter cake low in oil content. It is surprising that this hot water wash effectively removes additional oil from the filter cake, firstly, because the filtration at elevated temperatures would be expected to have removed essentially all of the oil that could be removed, and secondly, because the oil insolubility and immiscibility in water suggests that the water would flow through the filter cake without carrying any oil. Furthermore, since the filter cake obtained by the process of this invention is low in water and oil content, its transportation cost to the land spreading area is reduced, and incorporation in the soil requires no preliminary evaporation or other operations. Furthermore, since the solid filter cake is compact and low in oil content, a relatively small land area can accommodate the solid waste and storm water run-off does not carry off oil and cause stream pollution.

The refinery sludge materials which may be treated in accord with the process of the invention include contaminated bottoms from separators which receive oily process waters, non-contaminated bottoms from gravity separators receiving cooling water, storage tank bottom sludge, suspended silt from river water, spent activated carbon, oil-contaminated sand, catalyst fines from catalytic refinery operations, spent clay from various sources, various spent acid and alkaline materials (e.g., spent phosphoric acid), white water (e.g., a difficult to break oil-in-water emulsion generated by the mixing of oil used to flush lines and steam condensate), sludge from decant pits which will contain solids, oil, sulfur, etc., various solid refuse materials, and the like.

In carrying out the process the general oil containing materials are conducted to a primary storage facility and withdrawn as required. Spent clay, catalyst fines and white water, however, are preferably handled separately prior to the filtration step, but all of these materials are combined just before entering the filter press. In general, the various refinery oily sludges are gathered in a primary receiving and decanting tank and after decanting the material, the residue waste material is sent to a primary storage tank. It should be noted that the spent clay used in the process of the invention is normally removed from refinery operations (e.g., clay treating of oil) at elevated temperatures. Prior to use in subject process, such spent clay is preferably cooled at least by about 100° F. to avoid auto-combustion in transport and storage.

The filter press used in the process may be any of the conventional plate and frame type high pressure filter presses and a preferred type of press is a Beloit-Passavant press which is well known in the art. The total press equipment will comprise an air compressor, a sludge mix tank, a sludge pump, a feed tank, a precoat tank and the plate and frame filter press. The general refinery oily sludge from the primary storage tank together with spent clay, catalyst fines, caustic or lime, etc., are mixed in the sludge mix tank. It is preferred to adjust the pH to at least about pH 11 either with lime or with spent caustic, although pH adjustment is not essential if the higher temperatures are employed during filtration. The proportion of materials in this sludge mix is not critical and will usually be in that proportion reflecting the proportionate mix of the refinery. Before sending this sludge mixture to the filter it is raised to between about 100° F. and 200° F. In order to aid filtration the filter cloth of the filter is preferably precoated with diatomaceous earth, and further improvement is achieved by adding fly-ash, spent clay, or catalyst fines (generally obtained from an electrolytic separator) to the sludge as a filter aid. The heated mixed sludge is then fed to a cloth covered filter press under continually increasing pressure to maintain adequate flow until a pressure of about 225 p.s.i.g. is obtained. In this way the solids are retained on the cloth while water and oils pass through. The emulsions of water-in-oil and of oil-in-water are broken during filtration and this emulsion breaking permits easy recovery of the oil from the filtrate by simple mechanical separation such as by use of liquid level separators or skimmers to remove the oil upper layer of the broken aqueous emulsion. After the oil is separated from the filtrate, the water remaining is sufficiently clean that it may be reused as cooling water or for other refinery operations or it may be disposed through an ordinary waste water treatment system.

The filter cake resulting from the filtration will generally have a solids concentration exceeding 50% by weight and will also still contain from about 10% to about 20% by weight of oil. Washing the cake in the filter with hot water under pressure at about 125° to about 200° F. (preferably above 150° C.) will significantly reduce oil concentration in the cake (to about 5 to 15% by weight) and this wash water, of course, may be added to the filter press filtrate for additional oil recovery. The hot water washing also serves to reduce the pH of the material and this is desirable inasmuch as bacterial decomposition will proceed best at a pH of about 7, although biodegradation can occur at higher and lower pH levels, but may take a longer time. In carrying out the water wash of the filter cake, hot water under pressure will be applied to the cake while in the filter press. As pressure is applied, the flow rate of the filtrate will increase until a water pressure of about 225 p.s.i.g will have been reached, at which time the filtrate flow will have reached its maximum and operation at maximum pressure is preferred. Completion of the hot water wash is indicated by inspection of the filtrate to determine if oil is present, it being obvious that the hot water wash is completed when a significant amount of oil is no longer in the filtrate. Usually, a wash of from about 0.25 to 2.0 hours, preferably about 0.5 to about 1 hour is adequate time to achieve maximum oil removal from the cake. The solid cake after the hot water wash is taken from the filter and transported to a land area and after being broken apart is spread on the land and plowed into the soil whereby it is subjected to the effects of natural soil microorganisms (bacteria, fungi, etc.) to degrade the oil and other organics present in this solid waste. The properties of the soild filter press cake produced by this process are such that this soil biodegradation will not contaminate ground and surface run-off waters.

As pointed out above, biodegradation will proceed best in soils which are essentially neutral. Where the soil is acid additions of lime are helpful in increasing the pH. However, highly alkaline soils (as in the southwest areas of the United States) should be avoided since they are not conducive to the biodegration process. The load rate of solid waste onto the land will be based on the amount of oil in the filter cake and the cake will be used in an amount equivalent to 500 to 1000 barrels of oil per acre per year. Where the land is initially low in hydrocarbon decomposing microorganisms, their concentration may readily be increased by first using a lower level of waste (e.g., about 300–400 lbs./acre) and within about ten days the microorganisms will have multiplied to a concentration fully effective for use with the above loading. If maximum loading of oil (1000 bbl./acre/yr.) is used, it would probably be desirable to provide additional nitrogen, phosphorous, and potassium to the soil. The amount to be added will depend upon the original content of these nutrients in the soil, but approximately one ton of nitrogen will have to be available for each 100 bbls. of oil converted to microbial cells in an acre of soil. The time required for complete degradation of the organic materials will, of course, depend upon the particular type of soil, the climate, the concentration and type of bacteria present and, of course, the waste itself. In general, about 6 months to a year is required where the oil in the filter cake is predominantly paraffinic in nature. Asphaltic and highly condensed naphthenic and aromatic hydrocarbons will require a longer time span for complete degradation since such materials are resistant to biodegradation. Such factors and the techniques of soil degradation are well known and are disclosed in numerous publications, as for example, the Dotson et al. paper referred to above.

In order to further illustrate the invention the following examples are given:

EXAMPLE 1

To a water emulsion refinery oily sludge consisting by volume of 28% contaminated API separator sludge, 36% sludge decant pit material, and 36% tank bottoms, spent clay is added in an amount of 0.6 lbs. per pound of dry solids and lime is added in an amount of 0.12 lbs. per gallon, thereby providing a waste composition at pH 11 of 12% total solids and 8.5% oil. This composition is fed to a Beloit-Passavant filter press precoated with diatomaceous earth having 3 plates of 24 inches diameter at a feed temperature of 175° F. and filtration is completed in two hours. The filter cake contains 49.7% solids, 17.5% oil and the balance being water. The filtrate exits from the press at 100° F. and is observed to be no longer emulsified and oil and water form two layers after standing. Separation of the oil is readily accomplished by mechanical skimming. The filter cake is transported to a land farm where it is mixed into the soil. After weathering for 10 months, examination of the soil indicates essentially complete disappearance of the oil.

When the above filtration is carried out at 58° F., the filter cake contains over 15% more oil, thus indicating the importance of filtering at the elevated temperature.

EXAMPLE 2

A refinery oily sludge as used in Example 1 is similarly treated with 0.56 lbs. of clay per pound of dry solids and 0.07 lbs. of lime per pound of dry solids and is fed to a filter at 180° F. After one hour, the filter cake is washed with water under pressure at a temperature of 180° F. for one hour, the maximum pressure reaching 220 p.s.i.g. The filter cake after this treatment contains 60.5% total solids and 4.9% oil and the filtrate shows a sharp separation of oil and water which is readily separated. The solid filter cake is plowed into soil and results in essentially complete oil elimination after 12 months, at which time Bermuda grass seed previously sown on the soil germinated readily and matured to a good grass crop.

EXAMPLE 3

By following the essential details of the above examples and treating oil contaminated sludges from a refinery on a single filter press having 46 plates of 64 inches diameter, the operation including a 30 minute water wash in each 2.5 hour cycle, and operating 112 hours per week, 15,245,000 pounds of dry solids per year are processed and about 15,010,000 pounds of oil recovered.

The invention claimed is:

1. In the process of disposing of refinery waste sludge materials, the improvement which comprises dewatering and deoiling refinery sludges by heating said sludge to a temperature between about 100° F. and 200° F., filtering said heated sludge through a filter press at a temperature of from about 100° F. to about 200° F., washing the filter cake with water at a temperature between about 125° and 200° F. to obtain a filter cake containing from about 5% to 15% by weight of oil, recovering oil from the filtrate and spreading the solid oil-containing filter cake on land and plowing it into the soil to effect biodegradation of the oil.

2. The process of Claim 1 where the refinery waste sludge is adjusted to a pH of at least about 11.

3. The process of Claim 1 where the temperature of the water used to wash the filter cake is above 150° F.

4. The process of Claim 3 where the filter press is precoated with a filter aid.

5. The process of Claim 4 where the filter aid is diatomaceous earth.

References Cited

UNITED STATES PATENTS

| | | | |
|---|---|---|---|
| 3,692,668 | 9/1972 | McCoy et al. | 208—13 X |
| 3,477,814 | 11/1969 | Wilson | 208—13 X |
| 1,236,031 | 8/1917 | Wright et al. | 208—13 |
| 2,309,633 | 2/1943 | DuPont et al. | 208—13 |
| 1,634,514 | 7/1927 | Rial et al. | 208—13 X |
| 3,716,474 | 2/1973 | Hess et al. | 208—13 |

THOMAS G. WYSE, Primary Examiner

U.S. Cl. X.R.

210—10, 67